Aug. 22, 1950   C. D. TRIPP   2,519,417
THREAD GRIPPING LOCK NUT
Filed Jan. 27, 1949   5 Sheets-Sheet 1
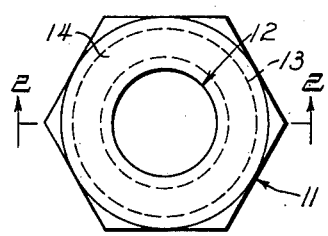
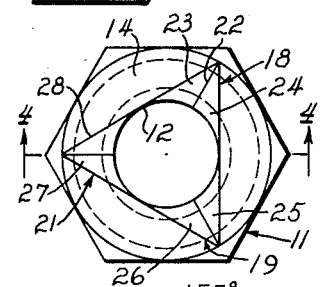
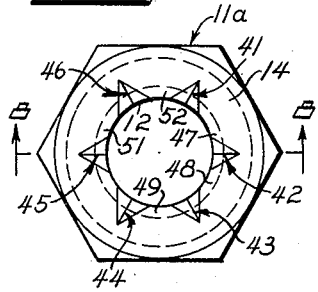
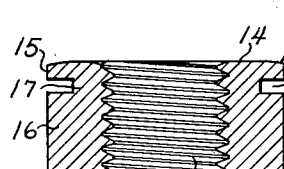
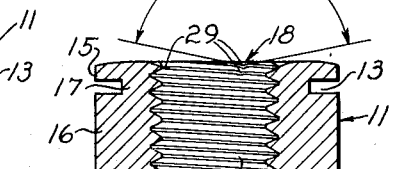
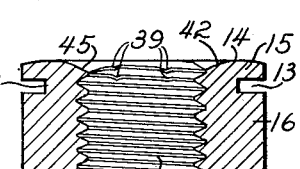
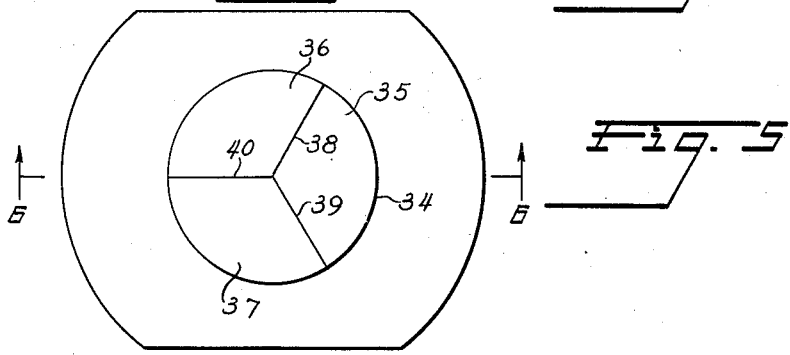
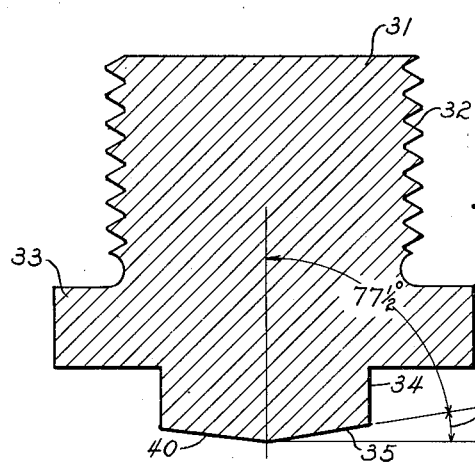
INVENTOR
CHESTER D. TRIPP
Strauch & Hoffman
ATTORNEYS Aug. 22, 1950 — C. D. TRIPP — 2,519,417
THREAD GRIPPING LOCK NUT
Filed Jan. 27, 1949 — 5 Sheets-Sheet 2

INVENTOR
CHESTER D. TRIPP

Strauch & Hoffman
ATTORNEYS

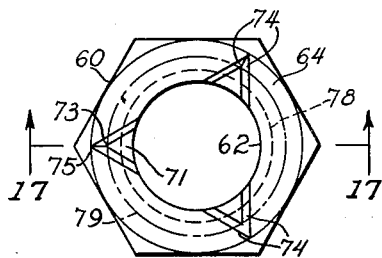
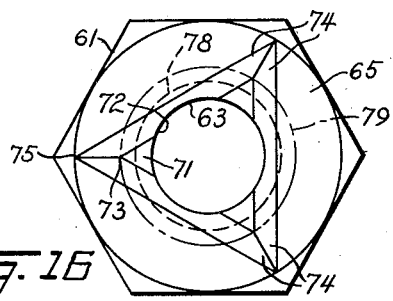
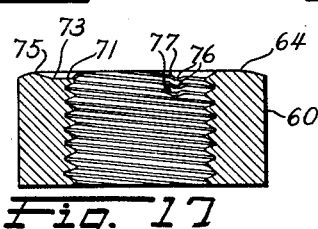
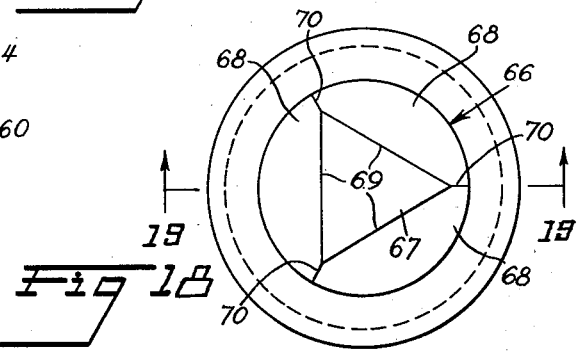
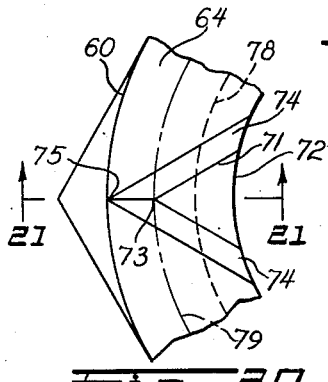
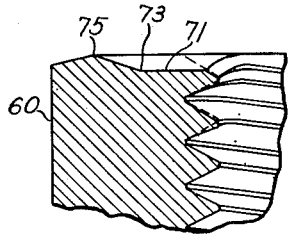
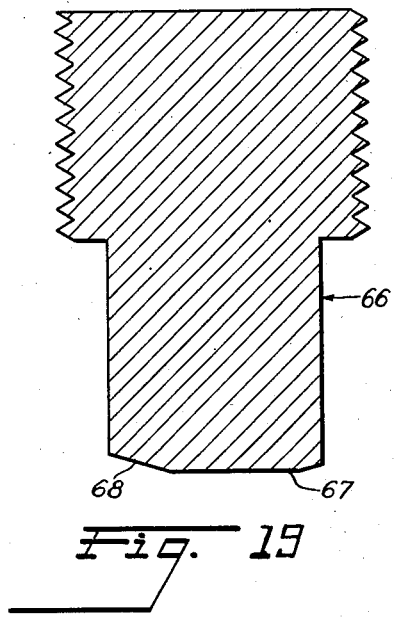

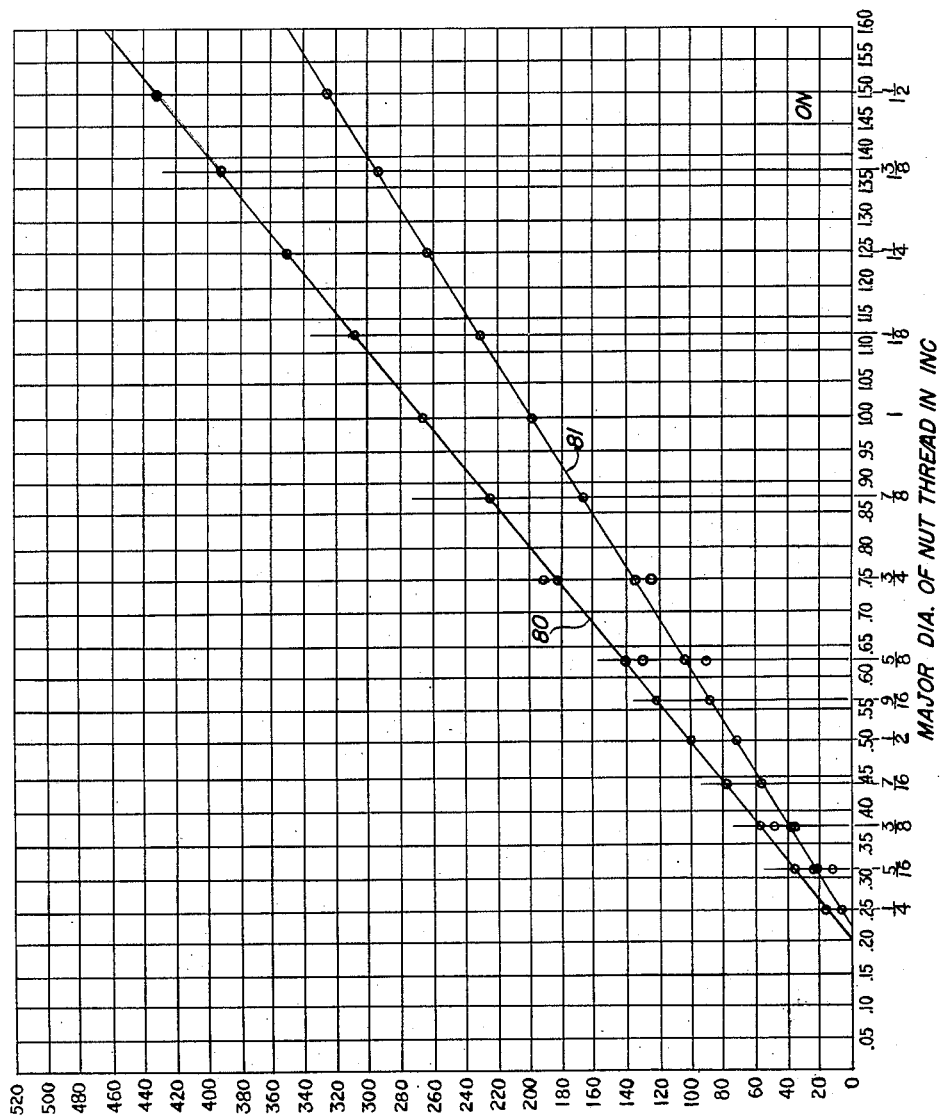

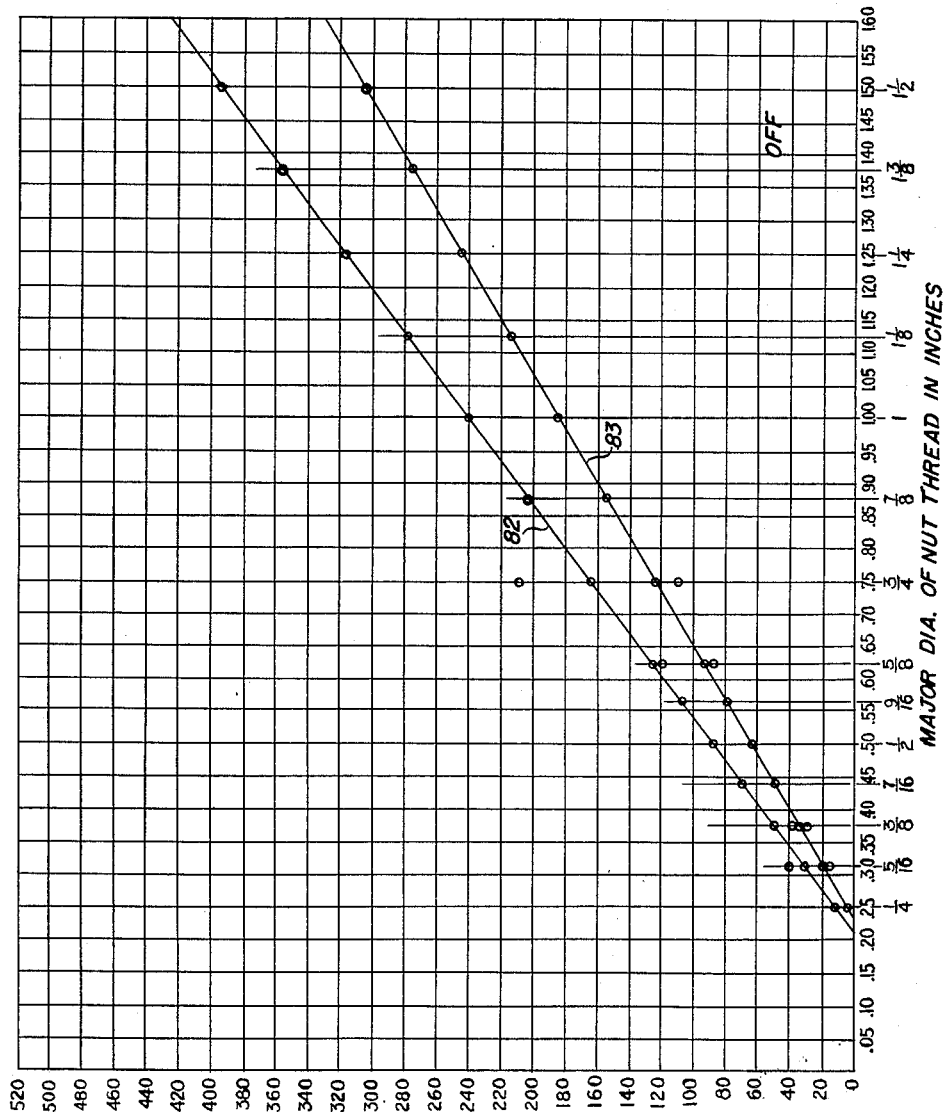

Patented Aug. 22, 1950

2,519,417

UNITED STATES PATENT OFFICE 2,519,417

THREAD GRIPPING LOCK NUT

Chester D. Tripp, Chicago, Ill., assignor to Grip Nut Company, South Whitley, Ind., a corporation of Illinois Application January 27, 1949, Serial No. 73,096

14 Claims. (Cl. 151—21)

1

This invention relates to lock nuts and is particularly concerned with lock nuts and their methods of manufacture wherein threads of ordinary nuts are controllably displaced and/or deformed for obtaining improved efficient locking characteristics of the entire nut.

The present application is a continuation-in-part of abandoned application Serial No. 545,290, filed July 17, 1944, and copending applications Serial No. 581,755, filed March 9, 1945, now abandoned, and Serial No. 22,483, filed April 21, 1948, now abandoned, and is directed to improvements over the lock nuts and methods of making the same disclosed and claimed in United States patent to Tripp No. 2,352,668, issued July 4, 1944, and United States patent to Luce No. 2,336,023, issued December 7, 1943.

As pointed out in Patent 2,352,668, there is a large demand for lock nuts which are inexpensive, reliable, adapted for mounting on ordinary standard bolt threads, and which can efficiently be manufactured by mass production methods with uniform locking characteristics. Solution of the problem created by this demand was not obvious, a fact attested by the large number of widely different patents in this field. The lock nut disclosed and claimed in the above-mentioned Tripp patent is a considerable advance in the art and renders available for the first time the manufacture of lock nuts of uniform and improved locking characteristics.

However, commercial use of the nuts of Patent No. 2,352,668 disclosed that the thread deformation and face indentations, particularly in fine thread nuts, must be so slight that care must be exercised to avoid an axial displacement of such magnitude as to substantially completely close the thread groove, that the resulting protuberances will not have sufficient frictional engagement with the bolt threads to produce the desired grip, and at times users are unable to visually identify the top or locking end of the nut, because of rust and the like formed during shipment and handling of the nuts and attempted to apply such nuts in inverted position. This resulted in difficult and improper starting of the nut, lost time in applying the nut and at times injury of the nut or bolt threads due to improper application of the nuts. The present invention contemplates further lock nut improvements, carrying forward certain aspects of and obviating the objections just pointed out to use of the nuts of Patent No. 2,352,668.

While numerous other forms of lock nuts embodying deformation of the nut thread by means of dies, hammer like blows and the like have been proposed, nuts having satisfactory locking action and susceptible of quantity production at reasonable cost have not been produced until very recently due to the inability to obtain invariably effective locking or gripping characteristics in a reusable nut.

Proir suggestions for deforming the nut thread to obtain a locking grip have employed dies designed to present a comparatively flat surface against an end face of the nut, or dies having deforming protuberances of triangular contour in cross section, the side faces of which are disposed at a relatively small angle to each other so as to form a chisel-like protuberance which acts to cut into the nut with little axial displacement of the nut metal and substantial circumferential and radial displacement in a plane normal to the nut axis.

It has been found impossible to provide an effective reusable nut having definite locking characteristics by these methods as tests have shown that: (1) by application of pressure in the direction of the axis of the nut with a flat contact surface normal to such axis, (a) high pressures beyond practical limits are required to effect any deformation of nuts of commonly employed composition, (b) the manner and direction of distortion cannot be controlled and is likely to destroy wrench fit, (c) the degree of locking grip cannot be selectively controlled; (2) the sharp penetrating members of triangular contour having sides disposed at a relatively small angle to each other displace the nut metal very slightly, if at all, axially and effect a substantial circumferential displacement and are impractical because (a) they tend to cut into the metal and through the threads with little, if any, axial flow of the metal, (b) they force the metal primarily in transverse directions resulting in a radial inward contraction of the bolt opening and radial outward expansion at the flats without providing an adequate axial protuberance or affording any control of the gripping effect, (c) they produce an unstable distortion axially of the bolt opening due to the separation of the metal of the thread and the incident lack of a continuous body of metal to resist the axial thrust of the bolt thread upon initial assembly, and (d) they destroy the wrench fit due to radial outward deflection along the flats.

It is, therefore, a desideratum of the present invention to obtain a nut having definite reusable, effective locking characteristics and in which that end of the nut having the gripping action can be readily and positively identified.

It is, accordingly, a further important object of the present invention to provide a lock nut with adequate gripping characteristics, even for fine thread nuts, and means for readily identifying the top or locking end of the nuts.

A further major object of the present invention is to provide a lock nut which is inexpensively made by simple manufacturing operations providing novel deformations and/or displacements of the threads of an ordinary nut.

Another object of the invention is to provide a novel lock nut having a bore of uniform diameter and a locking protuberance on the thread wall formed by one or more shallow radial depressions in an end face thereof, each depression, at the threaded nut bore, having a base portion of maximum depth, and said depression gradually diminishing in depth therefrom circumferentially of the bore to a minimum depth at the end face of the nut.

Another object of the invention is to provide a lock nut having an end face deformed at circumferentially spaced intervals to provide radially tapered axially depressed areas having their maximum depth at the wall of the nut bore.

Another object of the invention is to provide a lock nut wherein the locking end has protuberances whereby it can be readily and unmistakably identified.

A still further object of the invention is to provide a lock nut having a plurality of circumferentially spaced axially directed protuberances on an end face thereof deformed to effect locking deflection of the nut thread.

It is another object of the invention to provide a novel lock nut having two axially spaced offset threaded portions wherein certain of the threads adjacent an end face of one of said sections are formed with a plurality of circumferentially spaced helix angle deformations.

A further object of the invention is to provide a novel lock nut having a continuously threaded bore with the threads in a portion adjacent one end provided with spaced areas having a modified helix angle; and a novel method of making such a nut.

Still another object of the present invention is to provide novel die forms for imparting the desired deformation to a nut thread characterized by the rapidly increasing depression area principle of my above mentioned patent.

The present invention, in a preferred embodiment thereof, has for an additional object to provide an effective re-usable lock nut having the above structural characteristics, in which the depressions are so formed and dimensioned for nuts of different sizes and thread fineness that it is possible to calculate and predetermine, with reasonable accuracy, the torque pull in the application and removal of the nut to or from a complementary threaded bolt, to thereby avoid a quick loss of torque pull in the repeated use of the nut and insure substantially uniform locking action in nuts of different sizes.

To this end the depressions in the face of the nut are preferably formed with a flat triangular base portion, one side of which is coincident with the nut bore and having a radial dimension accurately predetermined with respect to the major thread diameter. The other two sides of said base portion are bounded by narrow surfaces inclined outwardly therefrom to the end face of the nut and intersecting at the apex of the triangle, thus providing a depression which decreases in depth circumferentially of the bore in each direction from the base portion, which lies in a plane normal to the nut axis. In forming such a depression in the nut face by an appropriately fashioned indenting die, the adjacent end threads of the nut bore are subjected to axial distorting pressure at angularly spaced areas to provide circumferentially elongated thread sections of altered helix angle, which are substantially co-extensive with the inner side of the triangular base portion of the depression, and without restriction in the diameter of the nut bore. Thus standard nuts may be converted into self-locking nuts having protuberant thread portions displaced from the normal helix angle only in the axial direction, and which will not be easily mutilated in the repeated use of the nut, with a rapid loss of torque pull.

Further objects of the invention will presently appear as the description proceeds in connection with the appended claims and annexed drawings wherein:

Figure 1 is a top plan view of a nut blank used in making a lock nut according to one embodiment of the invention;

Figure 2 is a section along the diameter of the nut blank of Figure 1 illustrating the continuous circumferential groove for providing a weakened intermediate portion;

Figure 3 is a top plan view of a lock nut made from the blank of Figures 1 and 2 wherein the nut is provided with thread locking formations as by striking an end face with a die, like that of Figures 5 and 6;

Figure 4 is a section through a diameter 4—4 of the nut of Figure 3;

Figure 5 is a bottom plan view of a die member made according to the invention especially adapted for striking the depressions illustrated in the end face of the nut of Figure 3;

Figure 6 is a section along a diameter 6—6 of the die member of Figure 5;

Figure 7 is a top plan view of a lock nut made according to a further embodiment of the invention, wherein six spaced depressions are formed about the nut bore instead of three depressions as in Figure 3;

Figure 8 is an axial section on line 8—8 through the nut of Figure 7;

Figures 15 and 16 are plan views of light and heavy duty nuts respectively, illustrating another alternative and preferred embodiment of the invention;

Figure 17 is a diametrical section through the nut of Figure 16 taken substantially on line 18—18;

Figure 18 is an end elevation illustrating the working face of a preferred form of indenting die for producing the depressions in the nuts of Figures 16 and 17;

Figure 19 is an axial section of the indenting die as indicated by the line 20—20 of Figure 19;

Figure 20 is a detail plan view of a nut fragment on an enlarged scale, showing the preferred form of depression in the end face thereof;

Figure 21 is a vertical section taken on line 22—22 of Figure 21, and

Figures 22 and 23 are graphs illustrating the trend of torque requirements in respectively applying and removing different sizes of lock nuts embodying the present invention.

Figure 9:
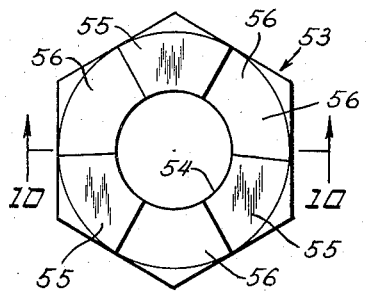
Figure 9 is a top plan view of a further nut blank adapted for producing a nut of the present invention.
Figure 10:
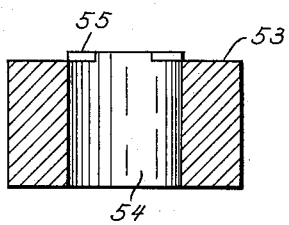
Figure 10 is a transverse sectional view taken substantially on the line 10—10 of Figure 9.

Referring now to Figures 1 and 2, an ordinary hexagonal nut body 11, preferably of steel, is provided with an internally threaded bore 12. Nut body 11 may be formed with a weakened portion intermediate its ends, preferably by provision of an open, continuous, deep, circumferential groove 13 formed in the outer lateral wall thereof. Groove 13 is preferably located adjacent and parallel to the trailing end face 14 of the nut. In practice, I have found it desirable to locate the groove 13 just beyond the first two or three threads of face 14 for a purpose to be presently pointed out. The radial depth of groove 13 is preferably selected to suitably weaken nut body 11 for axial deformation, and the width of groove 13 is preferably less than the thread pitch.

Groove 13 separates the nut body 11 into longitudinally spaced, internally threaded end portions, designated at 15 and 16, separated by a weaker intermediate portion 17 lying between the base of groove 13 and bore 12. It will be appreciated that nut body 11 may be suitably weakened by an internal groove formed in any well known manner or may not be weakened at all. A nut constructed in these latter ways, however, does not provide an intermediate, weakened, threaded section and consequently loses the locking effect produced by this section.

After nut body 11 has been formed with groove 13, the nut is deformed by applying axial compression to nut body 11 under controlled pressure, generally in the manner set forth in my above-mentioned patent and preferably by apparatus having controlled pressure application arrangements, such as is claimed in my co-pending applications Serial No. 517,409 filed January 7, 1944 now Patent 2,408,457, issued Oct. 1, 1946 and Serial No. 568,501 filed December 16, 1944. For obtaining the further improved locking characteristics of the nut of this invention, I preferably apply the axially directed force by means of a die member such as illustrated in Figures 5 and 6 and later to be described, which forms in the upper end face 14 of nut body 11 a plurality of similar, circumferentially spaced, shallow depressions 18, 19 and 21 as illustrated in Figures 3 and 4.

The bottom of depression 18 is defined by a substantially radial line 22 which is disposed at an angle, preferably an oblique angle, to the axis of bore 12 in their common plane. Line 22 is the intersection of inclined planar side walls 23 and 24, the whole defining a generally wedge shaped or pyramidal depression which is widest and deepest adjacent threaded bore 12 and becomes of progressively less depth and width radially outwardly of said bore. Depressions 18, 19 and 21 are preferably the same.

As illustrated in Figures 3 and 4, each depression and its resulting protuberance on the thread wall is relatively shallow as compared with its radial length and its width circumferentially of the threaded bore. Depression 19 is formed with inclined planar side walls 25 and 26, and depression 21 is formed with planar side walls 27 and 28. Each two adjacent depressions have their adjacent side walls lying substantially in a common plane. Thus, walls 24 and 25 lies in a common plane, walls 26 and 27 lie in a common plane, and walls 28 and 23 lie in a common plane.

Depressions 18, 19 and 21 are equi-spaced and their formation by suitable die pressure results in axially downward displacement of the metal of at least one and sometimes two threads therebeneath, thereby axially deforming the threads of upper body portion 15 at three equally spaced points to produce protuberances, indicated at 29 in Figure 4, on the threads of nut body portion 15 in the form of spaced, axially extending formations complemental to depressions 18, 19 and 21 and functioning as locking projections forming the whole or a part of the locking power of the nut. Protuberances 29, like depressions 18, 19, and 21, are relatively shallow as compared to their radial length and circumferential width, the maximum axial displacement into the thread groove being sufficiently less than the thread pitch to permit passage of a mating bolt thread while exerting a desired frictional resistance to relative rotation of the nut and bolt.

Further improvements in locking characteristics of the nut of Figures 3 and 4 also are obtained from the die member of Figures 5 and 6 since the axially directed pressure utilized to form the spaced shallow depressions 18, 19 and 21 in end face 14 of nut body 11 simultaneously slightly deforms the weakened nut body portion 17 by axially compressing it to a very slight degree. As a result, the lead of the threads in thin-walled body portion 17 is altered and a slight axial displacement of body portion 15 toward body portion 16 takes place so as to dispose the threads of portions 15 and 16 in axial out-of-phase relation.

The axial compression applied to nut body 11 need be sufficient to axially displace portion 15 toward portion 16 only a small fraction of the pitch of the thread of bore 12 to secure the desired deformation and resulting multiple locking characteristics. Theoretically the lock nuts made in this manner would have uniform locking characteristics if they had the same groove size, but due to manufacturing tolerances encountered in mass production and the small axial displacement of portion 15 involved such may not be practically possible. Under such conditions I may accurately control the degree of such axial displacement of each nut by feeding the grooved nut into a suitable automatic jaw device having a stop collar insertable into groove 13 during the axial compression step to limit the extent of deformation of the thin wall 17. This deformation of portion 17 and the out-of-phase relationship between portions 15 and 16 is very slight, any tendency to diametrically constrict the portion 17 being resisted by outward radial pressure forces applied to the nut metal by the sloping or inclined surfaces on the indenting die, to be presently described, which form the converging walls of the outwardly tapering depression in the end face of the nut. Other methods of controlling the axial compression of portion 17 of nut body 11 may be used as desired.

The improved lock nut made accordingly to the form of the invention illustrated in Figures 3 and 4 provides a nut having two longitudinally spaced thread portions, the threads of which are slightly out-of-phase in an axial direction, and one of which, adjacent an end face of the nut, has its threads deformed by shallow depressions modifying the helix angle thereof, connected by a threaded portion having threads of slightly decreased lead. These varying deflections are slight, do not stress the metal in any direction beyond its elastic limit and result in an overall locking effect produced by the cumulative effect of each deformation. When such a nut is assembled with a bolt, the threads of the latter turn freely through body portion 16, encounter a slight frictional resistance passing through the deformed threads of body portion 17 and encounter the primary gripping or locking force when the shallow protuberances 29 of the out-of-phase threads within body portion 15 are encountered. Accordingly, it will be seen that the tighter locking characteristic of the nut at nut body portion 15 is preceded by a lesser locking effect of the axially deformed threaded portion 17 and that these locking actions, due to the varying deformations, are additive to provide the full locking effect of such nuts.

Figures 5 and 6 illustrate a preferred form of die 31 made according to the invention for striking the depresisons 18, 19 and 21 in end face 14 of nut body 11. Die 31 includes a threaded attachment portion 32 for securing it to a reciprocating plunger or the like and a radially enlarged flange 33 below which is a reduced cylindrical die member 34 having spaced planar faces 35, 36 and 37 of equal area and inclined at the same angle to the axis of said die 34. Preferably, die 31 is made of hardened steel. Faces 35, 36 and 37 intersect in three equally spaced radial lines 38, 39 and 40 defining the tops of depression forming die projections. The included angle between intersecting planes must be maintained within definite limits to avoid a cutting of the thread on the one hand (the result of too small an included angle) or the failure to produce a sufficiently localized axial displacement on the other hand (the result of too great an included angle). Careful tests have established the critical limits to be 120° (lower limit) and 164° (upper limit) using depressing formations of true V-shape as disclosed by the die of Figures 5 and 6.

Preferably, faces 35, 36 and 37 are each arranged at an angle of about seventy seven and one half (77½°) degrees to the longitudinal axis of cylindrical die member 34 (Figure 6) so that shallow depressions 18, 19 and 21 formed thereby have their side wall faces inclined radially outwardly substantially at twelve and one half (12½°) degrees from the horizontal, for small nuts. This provides an included angle of one hundred fifty five (155°) degrees between the planar side walls 23—24, 25—26, and 27—28 and assures an obtuse angle of 96°15′ between the respective radial lines of intersection 22, and the axis of bore 12. Experiments have indicated that the desirable angle for a particular nut depends on the plasticity of the nut steel, the nature of the nut threads and other factors and that similar lock nuts formed with dies having their faces arranged at different angles within the critical range show predictably different locking characteristics. Hence, by properly selecting a die having its several striking faces arranged at a selected angle, it is possible to obtain predetermined locking characteristics in the nut. This phase of the invention affords a method of control over the locking characteristics by varying the angularity of the die faces which in the form of die of Figures 5 and 6 should be inclined not less than eight (8°) degrees and not more than thirty (30°) degrees from the horizontal.

The die of Figures 5 and 6 is made by starting with a cylindrical die member 34, grinding a planar end face in it at the selected angle, rotating member 34 about its axis 120° and grinding a second planar end face at the same angle, and finally further rotating member 34 about its axis 120° in the same direction and grinding the third planar end face to complete the die.

Figures 7 and 8 illustrate a further embodiment of the invention wherein grooved nut body 11a has end face 14 formed with six equi-spaced depressions instead of three as in Figure 3. Radial lines 41—46, inclusive, are defined in the spaced bottom walls of these depressions by the intersection of adjacent planar surfaces 47—52, inclusive, which are arranged at the same selected angle preferably, about 96°15′, to the axis of nut body 11a.

The lock nut illustrated in Figures 7 and 8 is formed by striking a grooved threaded nut body 11a with a die made similiarly to that of Figures 5 and 6 but having its striking end ground to provide six equally spaced circumferentially disposed planar faces inclined at the same angle to the longitudinal axis of the die. Illustration of this die is not deemed necessary to understand its construction.

As illustrated in Figure 8, formation of the six spaced end face depressions by die pressure results in the axial displacement of metal of the one or two threads of nut body portion 15 therebeneath to provide a plurality of thread locking projections 39 similar to those at 29.

In the phase of the invention illustrated in Figures 3–8, I may selectively provide desired locking characteristics in the lock nut product by choice of a suitable die. Thus I may provide a lock nut having spaced thread deformations of desired size and number, as dies having their depressions striking faces of corresponding number and angularity can readily be ground.

These same depressions and protuberances may alone be provided in a standard type nut or nuts having other means for identifying the locking end so as to secure a lock nut having predictable locking characteristics. The only practical difference between these latter nuts and the nuts heretofore described will be the absence of the additional locking effects due to the compressed centrally disposed threads and the offset relation between the thread sections on either side of the compressed threads. This difference, however, is of no consequence where the threads are sufficiently course to withstand greater deformation at the angularly spaced points to secure the desired gripping force.

Such a nut, having a different means for identifying the locking end, is shown in Figures 9 through 14 of the present application. This nut is preferably made from a blank 53 produced in a nut former and provided with a central bore 54 and three relatively thin upstanding bosses 55 angularly spaced from each other and having flat end faces normal to the axis of the nut. In the present instance, I have shown three such bosses having radial edges and bisected by a radius passing through alternate corners of the hexagonally shaped nut. Preferably these bosses have a thickness which is less than the root thickness of the thread subsequently formed on the wall of the bore 54, to facilitate angular displacement of parts thereof under comparatively low pressure. While a nut having three angularly spaced bosses as shown in Figure 9 is preferred, it is to be understood that the bosses may, if desired, be increased or decreased in number and that they need not necessarily be centered with respect to the corners of the nut. As a matter of fact, this centering is employed merely to facilitate proper angular adjustment of the die with relation to the protuberances and to assure accurate positioning of the nuts beneath the die.

Thus, the end of the bored nut blank is shaped to provide a plurality of comparatively shallow protuberant masses or bosses 55 the depth or axial dimension of which may only be a small fraction of the axial length of the nut body, so as to provide sufficient projection to enable ready identification visually or by touch and to accommodate suitable portions of the thread, for a purpose which will be hereinafter described. As shown at Figure 9 the total planar area of the bosses 55 may approximately equal that of the areas 56 of the end face of the nut body and may have divergent edges, to produce a sector shaped contour in plan, extending radially from the wall of the bore 54 to the outer edge faces of the nut. It is to be understood, however, that the shape, size and arrangement of the bosses may be varied to suit particular or desired conditions.

Figure 11:
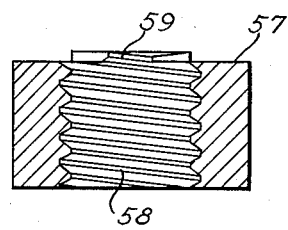
Figure 11 is a view similar to Figure 10 through a threaded blank and illustrating a partial thread in the boss prior to its deformation.

While any suitable dimensions may be used in making such nuts, a blank nut having a diameter of seven-eighths of an inch across the flats, a body height of seven-sixteenths of an inch and protuberances of approximately one thirty-second of an inch in height has been found particularly suitable for a nut having a half inch bore. Such a nut is shown on an exaggerated scale in the drawings for the purpose of illustrating the thread distortions. Figure 11 illustrates such a blank after tapping to form the thread and before the nut deforming pressures are applied. This blank is formed from the blank of Figures 9 and 10 by cutting the desired thread in the wall of the bore 54 and the sectional prolongations thereof formed by the inner ends of the bosses 55. This provides a nut 57 having a body thread 58 and a partial thread section 59 in each boss. In this connection, it is to be understood that the partial thread section 59 of each boss is in phase with the body thread 58.

Figure 12:
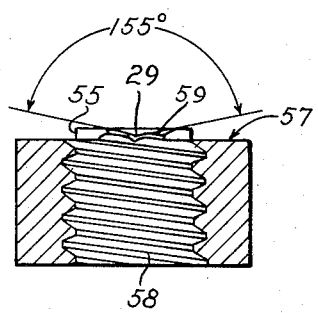
Figure 12 is a view similar to Figure 11 showing the threads in the bosses as deformed by a die substantially like that of Figures 5 and 6 with the crests of the intersecting die surfaces centered with respect to the bosses.

To produce the lock nut shown at Figure 12, the tapped nut of Figure 11 is indented by a die, such as shown at Figures 5 and 6.

Figure 14:
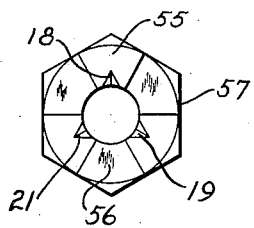
Figure 14 is a plan view of the locking nut shown at Figure 12.

Indentation of the nut may be effected by relative movements of the die and nut in a direction axially of the nut, either by movement of the die against the nut or vice versa. Thus, if it be assumed that the pressure is applied to move the die member 34 vertically downward against the embossed end face of the nut, with the crests 38, 39, and 40 positioned medially of the bosses 55, the resultant effect of the pressure by the inclined die face formation is to indent each boss so as to form a pyramidal depression in its inner end progressively decreasing in depth radially outward from its base to its apex. In other words, this depression increases in depth along a medial radial line from its apex on the face of the boss to the threaded wall of the bore and proportionately increases in width transversely of this radial line, as shown at Figure 14, so that the dimension of the depression in a plane normal to the axis, both radially and circumferentially of the nut, is greater than the maximum axial dimension or depth at the threaded bore 58. Thus said depression constitutes a shallow indentation of rapidly increasing surface area. As a result thereof, the center portions of the circumferentially separated thread sections 59 of the bosses are deflected axially of the surfaces 56 of the nut to change the helix angle of said thread sections 59 at each side of a median point relative to the helix angle of the nut threads 58 and produce locking protuberances 29 like those previously described. Thus the thread sections 59 are so deformed as to effectively grip the threads of a mating bolt and removably lock the nut thereon, without mutilation of the threads on said bolt or the nut.

Figure 13:
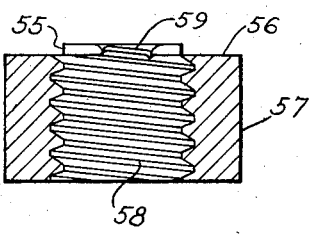
Figure 13 is a view similar to Figure 12 illustrating the threads in the bosses as deformed by means of a die substantially like that of Figures 5 and 6 positioned with the crests of the intersecting die surfaces disposed intermediate of the bosses.

It has also been found that by turning the die about its axis with relation to the nut so that the crests 38, 39 and 40 are centered with relation to the surface areas 56, each of the planar faces of the die head will exert pressure upon the confronting ends of the curvilinear inner edges of two adjacent elevated bosses 55 to depress the same to an oblique angle relative to the axis thereby deflecting parts of the end convolution of the nut thread 59 to impart locking characteristics thereto by distorting said thread convolution at circumferentially spaced points as shown at Figure 13. Such deformation in effect provides six depressions each corresponding to one half of the depressions 41–46 of Figure 7.

The deformation of the nut, in a manner above described, is such as to enable variable selectively controlled deflection or distortion of parts of the nut thread to provide frictional grip upon a mating bolt requiring predetermined torque or wrench pull to remove the nut and producing repeatedly reusable locking characteristics.

While the above described embodiments of the invention provide a wholly practical and effective lock nut, it has been found that in the use of a die having a pyramidal working face, as shown in Figures 5 and 6, the thread distortion 29 in nuts of certain sizes and particularly in so-called "fine thread" nuts was more or less superficial. While there is an increased locking torque upon initially applying the nut, the torque pull, because of the factors mentioned at page 1, soon decreased so that, in subsequent applications of the nut a substantial decrease in the gripping or locking effect occurred.

This difficulty can be definitely remedied by the alternative and preferred embodiment of the invention, illustrated in Figures 15 to 21 of the drawings, which will now be described.

The conventional or standard nut is substantially the same as that shown in Figures 1 and 2 except that the groove 13 and weakened end section 17 is not provided, since in view of the greater locking or gripping action of the thread distortions in this embodiment, it is not necessary to also dispose the distorted threads in out-of-phase relation.

In Figures 15 and 16 of the drawings I have illustrated, for purposes of comparison, light and heavy duty nuts, 60 and 61 respectively, of the same thread size, having threaded bores 62 and 63 respectively of relatively different diameters. The flat end faces 64 and 65 of the respective nuts are also of different diameters while the number of threads per inch of nut 60 is greater than that of nut 61.

To provide these nuts with thread distortions having substantially the required gripping or locking values, which will not be lost in repeated applications of the nuts, I employ an indenting die 66 which is preferably of the construction illustrated in Figures 19 and 20 of the drawings. As shown, the working face of this die is in the form of a truncated pyramid having a central pressure applying area 67 disposed in a plane normal to the die axis and having a maximum radial dimension exceeding that of the nut bore as will be presently pointed out. This area is bounded by the three chamfered or inclined faces 68 intersecting said plane and extending to the periphery of the die shank. These faces 68 have the same degree of inclination with respect to the die axis and directly adjoin each other circumferentially thereof as is the case with the faces of the die of Figures 5 and 6 and are formed in the same manner. Thus the lines of juncture 69 between the central surface area 67 and the inclined faces 68 define an equilateral triangle, with the sharp lines of juncture 70 between adjacent faces 68 extending radially from the intersection of the edges of the triangular area 67 to the periphery of the die shank and corresponding to the radial lines 38 to 40 of the die of Figures 5 and 6.

In the operation of selected sizes of dies 66, appropriate to the respective nuts of Figures 15 and 16, under predetermined controlled indenting pressures, three depressions or indentations are formed in the nut face 64—65, symmetrically spaced about and extending radially from the outer diameter of said nut face into the threaded opening or bore 62—63 of the nut. It will be evident that upon initial contact of the die with the nut, the major part of the die surface area 67 in parallelism with the nut face overlies the nut bore, and only the three apex portions of this surface are in pressure contact with the nut face. In the further downward movement of the die these portions of the die area 67 depress the nut metal axially of the nut bore and form equidistantly spaced depressions in the face of the nut, each having a flat triangular shaped base 71 lying in a plane normal to the nut axis, with an arcuate inner edge 72 constituted by a segment of the wall of the nut bore. From said bore the base of the depression radially decreases in width to the apex 73. Progressively with the formation of the base section 71 of the depression, adjacent inclined faces 68 of the die exert oppositely directed lateral and outward radial pressures on the nut metal along the side edges of the base 71 to form the outwardly flaring or beveled side walls 74 of the depression which are radially co-extensive with the base 71 and intersect at their outer ends along the valley formed by the edge 70 of the die, which connects the base apex 73 with an outer apex 75 lying substantially on the major diameter of the flat nut face 64.

From reference to Figure 17 of the drawings, it will be seen that in forming the depressions as above described by means of my novel indenting die, the axial displacement of the nut metal by the die surface 67 produces a zone of distortion of the adjacent end threads of the nut bore which is circumferentially co-extensive with the maximum width of the base section 71 of each depression along the edge 72 thereof, as shown at 76. Therefore, in each of these zones the helix angle of an elongated section of the thread is altered to provide a maximum gripping or locking action on the complementary bolt thread with a minimum axial displacement which cannot be easily ironed out by repeated application and removal of the nut.

The distorted thread sections are joined at their opposite ends to the normal thread sections by the inclined thread portions 77 which are produced by the lateral pressure forces applied to the nut metal by the die surfaces 68 in forming the side walls 74 of the depressions. This is an important feature of the invention, since these laterally applied pressure forces tend to prevent radial constriction of the original bore diameter and to resist or control the distortion of the first thread and cause the axial distorting pressure to be carried down to the next thread without further or additional distortion of the first thread. In other words the degree of distortion of at least the two end threads of the nut bore will be substantially equal.

Referring again to Figures 15 and 16 of the drawings, I have selected light and heavy duty nuts, which, it may be assumed for purposes of comparison, are of the same thread size, viz: $\tfrac{7}{8}''$ major or thread root diameter, indicated by the broken line 78. The light duty nut 60 has 14 threads per inch while the heavy duty nut 61 has nine threads per inch. The flat face 64 of nut 60 has a diameter of $1\tfrac{1}{4}''$, while the diameter of face 65 of nut 61 is $1\tfrac{7}{16}''$. The inner apex diameter 73 of the depression in both nuts is $1\tfrac{1}{16}''$ and spaced from the major thread diameter $\tfrac{3}{32}''$, as indicated by the broken line 79. The distance from the latter diameter to the outer diameter of the nut face is $\tfrac{3}{32}''$ in the nut 60 and $\tfrac{3}{16}''$ in nut 61.

It will be noted, since the apex diameter 79 of the depressions in both nuts and therefore of die surface 67 is the same, that, owing to the small diameter bore and greater thread depth of heavy duty nut 61, a correspondingly greater area of each apex portion of die surface 67 will contact the nut face, than would be the case in indenting the light duty nut 60. Of course, the width of the depressions along the base lines 72 is also proportionally greater in the nut 61 than in the light duty nut 60. Therefore, by the operation of the indenting dies on the light and heavy duty nut having fine and coarse threads respectively to produce substantially the same axial distortion of the nut thread, the respective gripping forces obtained, due to the proportionally greater circumferential length of the distorted thread sections in the heavy duty nut, will be substantially proportional to the differences in thread size. Thus, the torque required to apply or remove the light and heavy duty nuts will be proportionately the same.

The improved indenting die, forming the distorted thread sections 76 as above described, makes it possible to predict, with reasonable accuracy, the average torque trend line in applying and removing nuts of different thread sizes.

Referring to the graphs of Figures 22 and 23, the abscissa is in nut thread sizes and the ordinates in torque in inch pounds. Having first determined by actual tests the average torque pull, within certain limits due to variables, plus or minus 10%, on two sizes of nuts, say $\tfrac{1}{4}$ and $\tfrac{7}{8}''$, the average torque pull for nuts of all other sizes produced from the same material may be readily calculated. Thus as seen in Figure 22, in applying a $\tfrac{1}{4}''$ lock nut having 28 threads per inch, of the present invention, to studs or bolts of basic dimension, the torque was found to be approximately 15 inch pounds and on the $\tfrac{7}{8}''$ nut having 14 threads per inch, approximately 226 inch pounds. From these tests the torque pull on nuts of other sizes can be readily determined, showing a fairly straight basic torque trend line, as indicated at 80.

A test of nuts of the same sizes for studs conforming to the low limits of class #2 fit, shows a torque of 6 inch pounds on the ¼" nut and 168 inch pounds for the ⅞" nut, with a torque trend line for nuts of all sizes having a class #2 fit as indicated at 81.

In unthreading or removing the lock nut from the studs or bolts, the torque requirements are indicated in Figure 23 by the basic torque trend line 82, and the torque trend line 83 for nuts having a class #2 fit. On a ¼" nut of the latter type, the required torque is approximately 4 inch pounds and on the ⅞" nut it is approximately 155 inch pounds.

It is thus seen that in addition to its novel functional features this embodiment of my invention enables the manufacturer to predict with reasonable certainty, and to prove by practical demonstration, the torque requirements for lock nuts throughout an extensive range of different sizes. It has not heretofore been possible to supply such information for aid in the use of prior art lock nuts of this type.

While the same angular relationship used in producing the die of Figures 5 and 6 may be used in forming faces 68 and the same angular relationship may exist between lines 70 and the die axis as exists between the lines 22 and the axis of the die of Figures 5 and 6, the truncated form of die 66 and its manner of cooperating with the end face of the nut substantially reduces the cutting tendency of the die. As a consequence, the included angle between adjacent intersecting faces 68 can be much more acute without encountering the objections present in the prior chisel-like indenting formations. Also a reduction in the magnitude of the included angle occurs in this truncated type die, since the objectionable factors present in perfectly flat dies will sooner be exhibited. Actual tests show that the included angle between faces 68 in the truncated type die must not be less than 100° (lower limit) nor more than 160° (upper limit).

Preferably faces 68 of die 66 are each arranged at an angle of about seventy five degrees to the longitudinal axis of die member 16 so that walls 74 of the depressions in the nut face are inclined radially outwardly substantially at fifteen (15°) degrees to the horizontal. This provides an included angle of one hundred fifty (150°) degrees. The same factors affect the choice of angles in this die as in the die of Figures 5 and 6. However, in this form of the invention the angularity of the inclined walls from the horizontal should be not less than ten (10°) degrees and not more than forty (40°) degrees.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A lock nut having a threaded bore and circumferentially arranged axially displaced areas in the under wall of the thread adjacent an end face thereof; each of said displaced areas being defined by outwardly extending lateral faces and being of progressively diminishing axial displacement circumferentially and radially outwardly from an area of maximum axial dimension at the crest of the thread, said maximum axial displacement being sufficiently small compared to the pitch of the thread to permit the passage of a mating bolt thread yet frictionally resist relative rotation of the nut and bolt, and the included angle between said lateral faces being not less than 100° and not more than 164°.

2. A lock nut having a threaded bore, the thread at one end of the bore being displaced toward the other end of the bore at a plurality of circumferentially arranged regions; each of said regions being displaced axially at the crest of the thread a maximum distance sufficiently less than the pitch of said threads to permit the passage of a mating bolt thread yet frictionally resist relative rotation of the nut and bolt, with the surface of said regions sloping back from said crest toward said one end of said bore between the crest and root of said thread with the lateral sides of said regions sloping oppositely from a central ridge and defining an included angle of not less than 100° and not more than 164°.

3. A lock nut having a threaded bore and circumferentially spaced depressions in an end face thereof; said depressions each extending into the threaded nut bore and having outwardly converging lateral faces defining an included angle of not less than 100° and not more than 164° and a depression diminishing in depth radially outwardly and circumferentially from an area of maximum depth at the nut bore and providing the under wall of the thread adjacent said end face with complemental axial protuberances having an area of maximum axial displacement at the crest of the thread and lateral faces defining an included angle of not less than 100° and not more than 164° and areas of progressively lesser axial displacement circumferentially and outwardly of said area of maximum axial displacement which is sufficiently small compared to the pitch of the thread to permit the passage of a mating bolt thread while frictionally resisting relative rotation of the nut and bolt.

4. A lock nut having a threaded bore and circumferentially spaced axially displaced areas in the under wall of the thread adjacent an end face thereof; each of said displaced areas comprising an area of maximum axial displacement defined by a substantially planar surface extending outwardly from the crest of the thread, said maximum axial displacement being sufficiently small compared to the pitch of the thread to permit the passage of a mating bolt thread yet frictionally resist relative rotation of the nut and bolt and outwardly extending lateral faces defining an included angle of not less than 100° and not more than 160° and areas of progressively diminishing axial displacement circumferentially and radially outwardly from said planar surface.

5. The combination defined in claim 4 wherein said displaced areas are three in number equidistantly spaced around the nut bore.

6. The combination defined in claim 4 wherein said planar surface is triangular and lies in a plane normal to the axis of the bore with its base line defining segments of the bore and its apex on a circle of predetermined diameter intermediate the root diameter of the thread and the major diameter of the nut.

7. A lock nut having a threaded bore and circumferentially spaced axially extending protuberant areas in the under wall of the thread adjacent an end face thereof; each of said protuberant areas comprising a substantially planar surface disposed normal to the axis of said nut in spaced relation to said thread wall with its lateral edges extending generally from the crest toward the root of said thread, the maximum axial distance of said planar surface from the wall of said thread being at the thread crest and sufficiently small compared to the pitch of the thread to permit the passage of a mating bolt thread yet frictionally resist relative rotation of the nut and bolt, and lateral faces sloping outwardly from said planar surface toward said thread wall and providing lateral areas of progressively diminishing axial dimensions.

8. The nut defined by claim 7 wherein said protuberant areas are of generally triangular configuration in plan with the apex adjacent the outer diameter of the nut and the base line defining segments of the nut bore.

9. The nut defined by claim 7 wherein said planar surface is of triangular configuration in plan with its apex lying radially inwardly from the apex of said protuberant area, its base line forming a segment of said base line of said protuberant area, and its lateral edges parallelling the lateral faces of said protuberant area.

10. A lock nut having a threaded bore and circumferentially spaced axially displaced areas in the under wall of the thread adjacent an end face thereof comprising axial protuberances having progressively decreasing axial dimensions radially outwardly from the nut bore and progressively decreasing angular dimensions outwardly from an area of maximum angular dimension at the thread crest consisting of a planar area normal to the axis of the bore having one side defining a segment of the bore and its opposite lateral sides extending generally outwardly to a circle of a predetermined diameter lying between the root diameter of the thread and the major diameter of the nut, the maximum axial displacement being such compared to the pitch of the thread as to permit the passage of a mating bolt thread and the maximum angular dimension being sufficiently greater than the maximum axial dimension to avoid a cutting of the thread and to assure an axial displacement component substantially greater than the lateral displacement component and frictional engagement between the surfaces of said protuberances and the adjacent face of the mating bolt thread throughout a substantial helical distance whereby the gripping pressures are distributed over relatively great areas to thereby decrease the per unit area pressures and the inherent tendency to restore the displaced areas to normal.

11. The nut of claim 10 wherein said planar area is of substantially triangular configuration, the base of which is the side defining a segment of the bore.

12. A lock nut having two longitudinally spaced out-of-phase thread sections of uniform pitch at opposite ends of the nut bore connected by a thread section of slightly decreased pitch, and circumferentially spaced axially displaced areas in the under wall of the thread of one of said two spaced sections adjacent the end face thereof, each of said displaced areas being defined by outwardly extending lateral faces and being of progressively diminishing axial displacement circumferentially and radially outwardly from an area of maximum axial dimension at the crest of the thread, said maximum axial dimension being sufficiently small compared to the pitch of the thread to permit the passage of a mating bolt thread yet frictionally resist relative rotation of the nut and bolt, and the included angle between said lateral faces being not less than 100° and not more than 164°.

13. A lock nut comprising a body provided with a bore and an axially projecting sectoral end boss the inner face of which is of arcuate shape and forms an extension of said bore; a thread formation in said bore; and a thread sector on said inner face of said boss in phase with said thread formation and having an axially displaced area in the under wall thereof defined by outwardly extending lateral faces and being of progressively diminishing axial dislacement circumferentially and radially outwardly from an area of maximum axial displacement at the crest of said thread sector, said maximum axial displacement being sufficiently small compared to the pitch of said thread formation and thread sector to permit the passage of a mating bolt thread yet frictionally resist relative rotation of the nut and bolt and the included angle between said lateral faces being not less than 100° and not more than 164°.

14. A lock nut comprising a body provided with a threaded bore; an axially projecting sectoral boss extending from one end of said body and having its major dimension disposed in a plane normal to the nut axis and its inner face forming an extension of the nut bore and being threaded to provide a thread sector in phase with but discontinuous from the thread in the bore; and an axially displaced area of triangular configuration in the under wall of said thread sector defined by outwardly extending converging, lateral faces and being of progressively diminishing axial displacement circumferentially and radially outwardly from an area of maximum axial displacement at the crest of said thread sector, said maximum axial displacement being sufficiently small compared to the pitch of said thread formation and thread sector to permit the passage of a mating bolt thread yet frictionally resist relative rotation of the nut and bolt, and the included angle between said lateral faces being not less than 100° and not more than 164°.

CHESTER D. TRIPP.

No references cited.

Certificate of Correction

Patent No. 2,519,417 August 22, 1950

CHESTER D. TRIPP

It is hereby certified that error appears in the printed specification of the above numbered patent requiring correction as follows:

Column 5, line 6, for "Figures 16 and 17" read *Figures 15 and 16*; line 8, for "20—20 of Figure 19" read *19—19 of Figure 18*; line 13, for "22—22 of Figure 21" read *21—21 of Figure 20*; column 6, line 9, for the word "lies" read *lie*; line 74, for "accordingly" read *according*; column 9, lines 37 and 38, for "thirty-second" read *thirty-second*;

and that the said Letters Patent should be read as corrected above, so that the same may conform to the record of the case in the Patent Office.

Signed and sealed this 7th day of November, A. D. 1950.

[SEAL]

THOMAS F. MURPHY,
*Assistant Commissioner of Patents.*